United States Patent
Chen

(10) Patent No.: US 7,899,446 B2
(45) Date of Patent: Mar. 1, 2011

(54) METHOD OF CONTROLLING A PDA PHONE AND PDA PHONE USING THE SAME

(75) Inventor: Wei-Ting Chen, Taipei County (TW)

(73) Assignees: Giga-Byte Communications Inc., Taipei County (TW); Giga-Byte Technology Co., Ltd., Taipei Hsien (TW)

( * ) Notice: Subject to any disclaimer, the term of this patent is extended or adjusted under 35 U.S.C. 154(b) by 849 days.

(21) Appl. No.: 11/812,649

(22) Filed: Jun. 20, 2007

(65) Prior Publication Data
US 2008/0318628 A1      Dec. 25, 2008

(51) Int. Cl.
    *H04M 3/00* (2006.01)
(52) U.S. Cl. .................. 455/418; 455/419; 455/550.1; 370/338
(58) Field of Classification Search .............. 455/418, 455/419, 550.1; 370/338
    See application file for complete search history.

(56) References Cited

U.S. PATENT DOCUMENTS

| | | |
|---|---|---|
| 6,727,920 B1 | 4/2004 | Vineyard, Jr. et al. |
| 6,976,217 B1 | 12/2005 | Vertaschitsch et al. |
| 2002/0006117 A1* | 1/2002 | Duske et al. ............... 370/316 |
| 2003/0084056 A1* | 5/2003 | DeAnna et al. ............ 707/100 |
| 2005/0202841 A1* | 9/2005 | Brobston et al. ......... 455/552.1 |
| 2007/0067373 A1* | 3/2007 | Higgins et al. ............. 707/206 |
| 2007/0157103 A1 | 7/2007 | Arneson et al. |

FOREIGN PATENT DOCUMENTS

| | | |
|---|---|---|
| GB | 2 419 009 A | 4/2006 |
| GB | 2 429 080 A | 2/2007 |

OTHER PUBLICATIONS

Frost, "Thinking Thin," Linux Journal (Online), vol. 2006, No. 256, pp. 1-10, URL: http://delivery.acm.org'10.1145/1190000/1183035/9108.html?key1=11883035&key2=7920596911&coll=GUIDE&dl=GUIDE&CFID=8814412&CFTOKEN=31971431>, (2006).

* cited by examiner

*Primary Examiner*—Danh C Le
(74) *Attorney, Agent, or Firm*—Birch, Stewart, Kolasch & Birch, LLP

(57) ABSTRACT

A method for controlling a PDA (personal digital assistant) phone is provided. A first interface configuration file and a second interface configuration file are provided. An interface selection command is received, designating the first or second interface configuration file. A first boot procedure is performed. The first or second interface configuration file is loaded and displayed as an operation interface of the PDA phone.

12 Claims, 6 Drawing Sheets

METHOD OF CONTROLLING A PDA PHONE AND PDA PHONE USING THE SAME

BACKGROUND

The invention relates to a PDA (personal digital assistant) phone, and in particular to a method of controlling a PDA (personal digital assistant) phone.

This section is intended to introduce the reader to various aspects of art, which may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Recently, PDA (personal digital assistant) phones have been available to all. A PDA phone provides variable functions. To access these functions, however, complicated manipulation procedures are required, inconvenience is incurred thereby. For example, to execute a function, a user scrolls through a hierarchical menu to execute the desired function.

In addition, function menu displayed in a user interface for a conventional PDA phone differs from a normal mobile phone. Users who are familiar with manipulation of a normal mobile phone may have trouble in using the PDA phone. He or she cannot find a desired function item simply at a guess. For example, a Windows Mobile operation system, which is common for a PDA phone, presents a user interface similar to a Window interface implemented in a computer system. The user interface presented by the Windows Mobile operation system is widely different from a user interface provided in a mobile phone. Accordingly, users who are familiar with manipulation of a normal mobile phone may have trouble in using the PDA phone.

Accordingly, a new user interface is needed for a PDA phone to overcome the described problem.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

A method of controlling a PDA (personal digital assistant) phone is provided. A first interface configuration file and a second interface configuration file are provided. An interface selection command is received, designating the first interface configuration file or the second interface configuration file. A first boot procedure is preformed. The first interface configuration file or the second interface configuration file designated by the interface selection command is loaded, and an interface specified thereby is displayed as a user interface of the PDA phone.

A PDA (personal digital assistant) phone is provided. A storage device stores a first interface configuration file and a second interface configuration file. An input device receives an interface selection command, designating the first interface configuration file or the second interface configuration file. A controller performs a first boot procedure, and loads the first interface configuration file or the second interface configuration file designated by the interface selection command. A display device displays an interface specified thereby as a user interface of the PDA phone according to direction of the controller.

A storage medium for storing a user interface controlling program for a PDA (personal digital assistant) phone is provided. When the user interface controlling program is loaded into the PDA phone, the PDA phone is directed to perform the steps of: receiving a first interface configuration file and a second interface configuration file; receiving an interface selection command, designating the first interface configuration file or the second interface configuration file; when the PDA phone performs a first boot procedure, loading the first interface configuration file or the second interface configuration file designated by the interface selection command, and displaying an interface specified thereby as a user interface of the PDA phone.

BRIEF DESCRIPTION OF DRAWINGS

The invention can be more fully understood by reading the subsequent detailed description and examples with references made to the accompanying drawings, wherein.

DETAILED DESCRIPTION

One or more specific embodiments of the invention are described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constrains, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
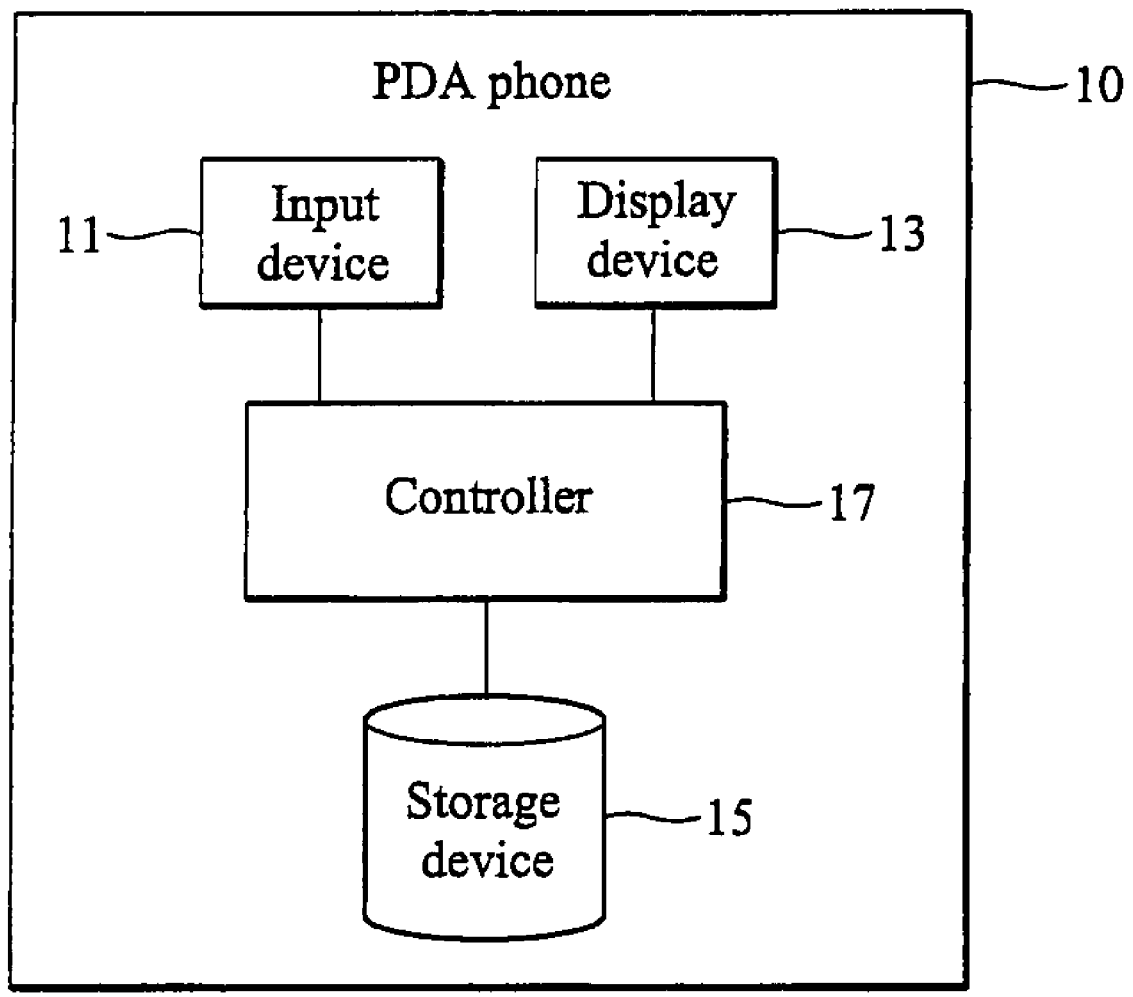
FIG. 1 is a schematic view of an embodiment of a PDA (personal digital assistant) phone.

In the following detailed description, reference is made to the accompanying drawings which form a part hereof, shown by way of illustration of specific embodiments. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore, not to be taken in a limiting sense. The leading digit(s) of reference numbers appearing in the figures corresponds to the Figure number, with the exception that the same reference number is used throughout to refer to an identical component which appears in multiple figures. It should be understood that the many of the elements described and illustrated throughout the specification are functional in nature and may be embodied in one or more physical entities or may take other forms beyond those described or depicted.

FIG. 1 is a schematic view of an embodiment of a PDA (personal digital assistant) phone. As shown in FIG. 1, a PDA phone 10 comprises an input device 11, a display device 13, a storage device 15, and a controller 17.

The PDA phone 10 is a multifunctional portable electronic device. Generally, the PDA phone 10 implements a Palm operation system or a Windows Mobile operation system. Here, PDA phone 10 implementing Windows Mobile operation system is used as an example. The Windows Mobile operation system provided by Microsoft presents a user interface similar to an interface of a computer system presented by Windows operation system. According to the user interface provided by the Windows Mobile operation system, various functions provided by the PDA phone is arranged in a multi-layer hierarchical menu for user reviewing and selection.

The input device 11 comprises input gadgets such as keys for receiving user input. The display device 13 can be a display screen displaying a user interface and information. The storage device 15 stores a plurality of interface configuration files in advance. For example, storage device 15 stores a PDA phone interface configuration file and several mobile phone interface configuration files. The PDA phone interface configuration file specifying a PDA phone user interface defined by a PDA phone manufacturer. Each of the mobile phone interface configuration files specifies a phone user interface simulating a phone user interface of a particular phone type defined by a phone manufacturer. When input device 11 receives an interface selection command, the controller 17 performs a boot procedure, loads the PDA phone interface configuration file or the mobile phone interface configuration file designated by the interface selection command, and displaying an interface specified thereby as a user interface of the PDA phone.

In addition, contents of the interface selection command can be stored in the storage device 15 through index information such as a flag. Afterward, when the PDA phone is booted again, the interface configuration file that has been designated by a user is automatically loaded for default user interface. For example, the storage device 15 stores a flag, specifying the PDA phone interface configuration file or one of the mobile phone interface configuration files designated by the interface selection command as a default interface configuration file. Afterward, when the PDA phone is booted again, the stored interface configuration file associated with the flag is automatically loaded for default user interface.

A user can switches the user interface currently displayed by the PDA phone after the boot procedure has completed, and the designated interface configuration file has been loaded. In this situation, the input device 11 receives an interface switching command. The controller 17 determines whether the user interface currently displayed corresponds to the PDA user interface defined by the PDA phone interface configuration file or the mobile phone user interface defined by the mobile phone interface configuration file. If the user interface currently displayed corresponds to the PDA phone interface configuration file, one of the mobile phone interface configuration files is loaded, and the mobile phone interface defined by the mobile phone interface configuration file is displayed as the user interface of the PDA phone. If the user interface currently displayed corresponds to one of the mobile phone interface configuration files, the PDA phone interface configuration file is loaded, and the PDA phone user interface defined by the PDA phone interface configuration file is displayed as the user interface of the PDA phone.

The method of the present invention, or certain aspects or portions thereof, may take the form of program code (i.e. instructions) embodied in a tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Figure 2:
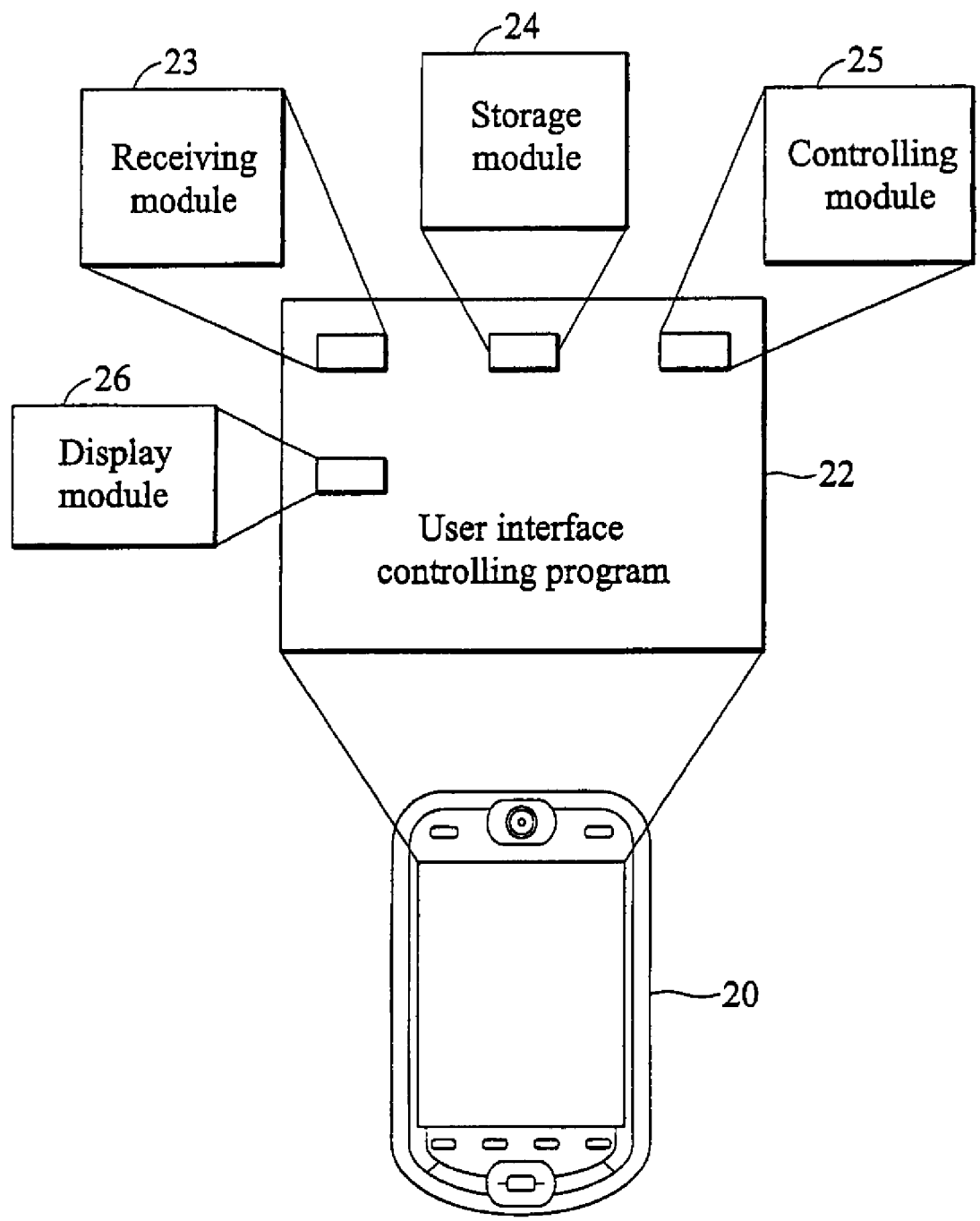
FIG. 2 is a diagram of an embodiment of a storage medium.

FIG. 2 is a diagram of an embodiment of a storage medium. A storage medium stores a user interface controlling program for a PDA (personal digital assistant) phone, when the user interface controlling program is loaded into the PDA phone, the PDA phone is directed to perform a method of controlling the PDA phone. As shown in FIG. 2, storage medium implemented in a PDA phone 20 is provided. The storage medium stores a user interface controlling program 22 for PDA phone 20. When the user interface controlling program 22 is loaded into the PDA phone 20, the PDA phone 20 is directed to perform the method of controlling the PDA phone. The user interface controlling program 22 comprises receiving module 23 for receiving a first interface configuration file and a second interface configuration file, and receiving an interface selection command, designating the first interface configuration file or the second interface configuration file; a storage module 24 for storing the first interface configuration file and the second interface configuration file; a controlling module 25 for loading the first interface configuration file or the second interface configuration file designated by the interface selection command when the PDA phone performs a first boot procedure; and a display module 26 for displaying an interface specified thereby as a user interface of the PDA phone.

Figure 3:
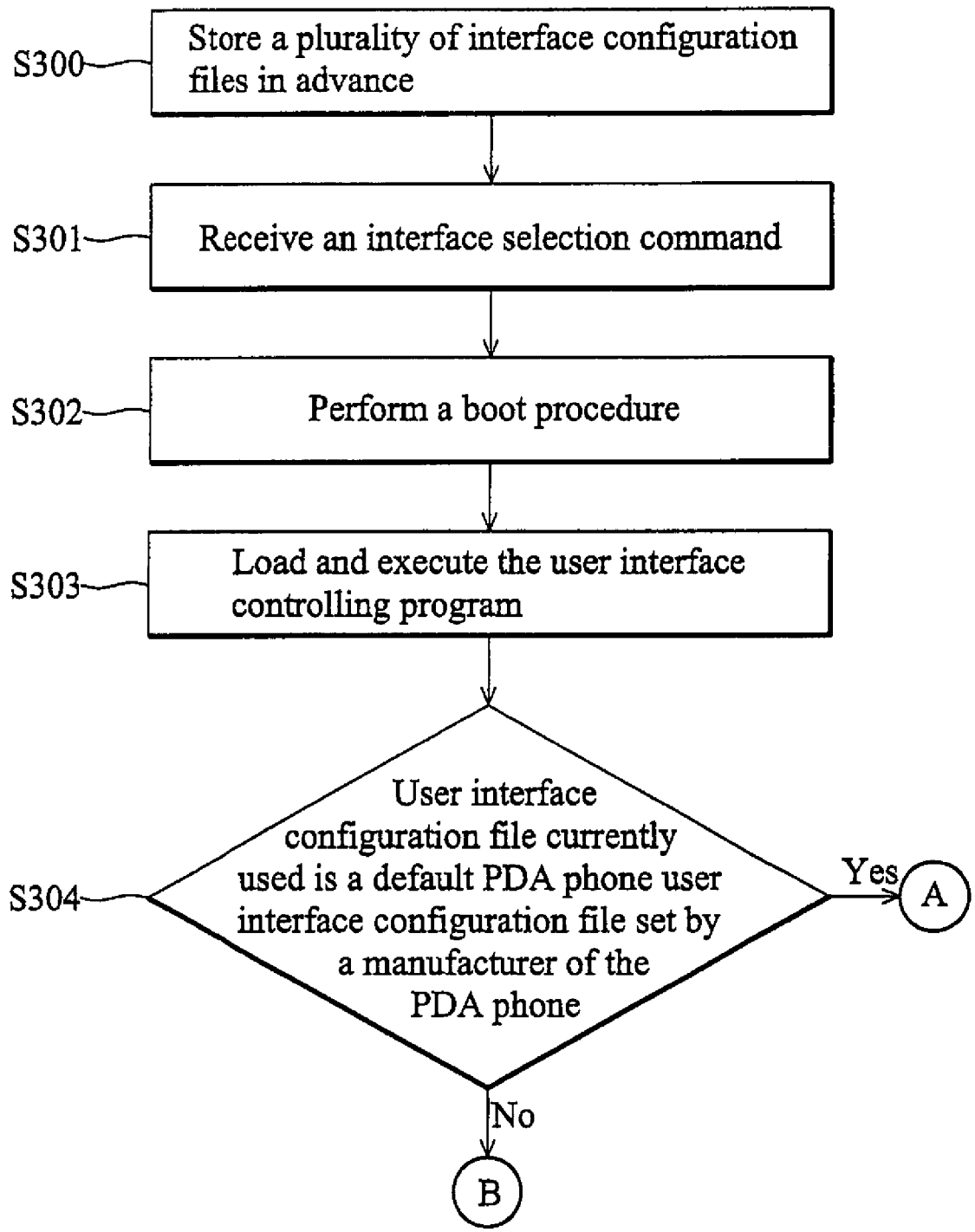
FIG. 3 is a flowchart of an embodiment of a method of controlling a PDA phone.

FIG. 3 is a flowchart of an embodiment of a method of controlling a PDA phone. The method of controlling a PDA phone can be implemented in the PDA phone of FIG. 1, and can be implemented by loading the user interface controlling program stored in the storage medium of FIG. 2 into the PDA phone.

In step S300, a plurality of interface configuration files are stored in advance. For example, a PDA phone interface configuration file and several mobile phone interface configuration files are stored in advance. The PDA phone interface configuration file specifying a PDA phone user interface defined by a PDA phone manufacturer. Each of the mobile phone interface configuration files specifies a phone user interface simulating a phone user interface of a particular phone type defined by a phone manufacturer. In step S301, an interface selection command is received, wherein the interface selection command designates the PDA phone interface configuration file or the mobile phone interface configuration file. Contents of the interface selection command can be stored through index information. The index information can be information such as a flag, specifying the PDA phone interface configuration file or the mobile phone interface configuration file as a default interface configuration file.

In step S302, a boot procedure is preformed.

In step S303, after the boot procedure is started, the user interface controlling program of FIG. 2 is loaded and executed.

In step S304, it is determined whether the user interface configuration file currently used by the PDA phone is a default PDA phone user interface configuration file set by a manufacturer of the PDA phone, and if so, the method proceeds to procedure A, otherwise, to procedure B.

Figure 4:
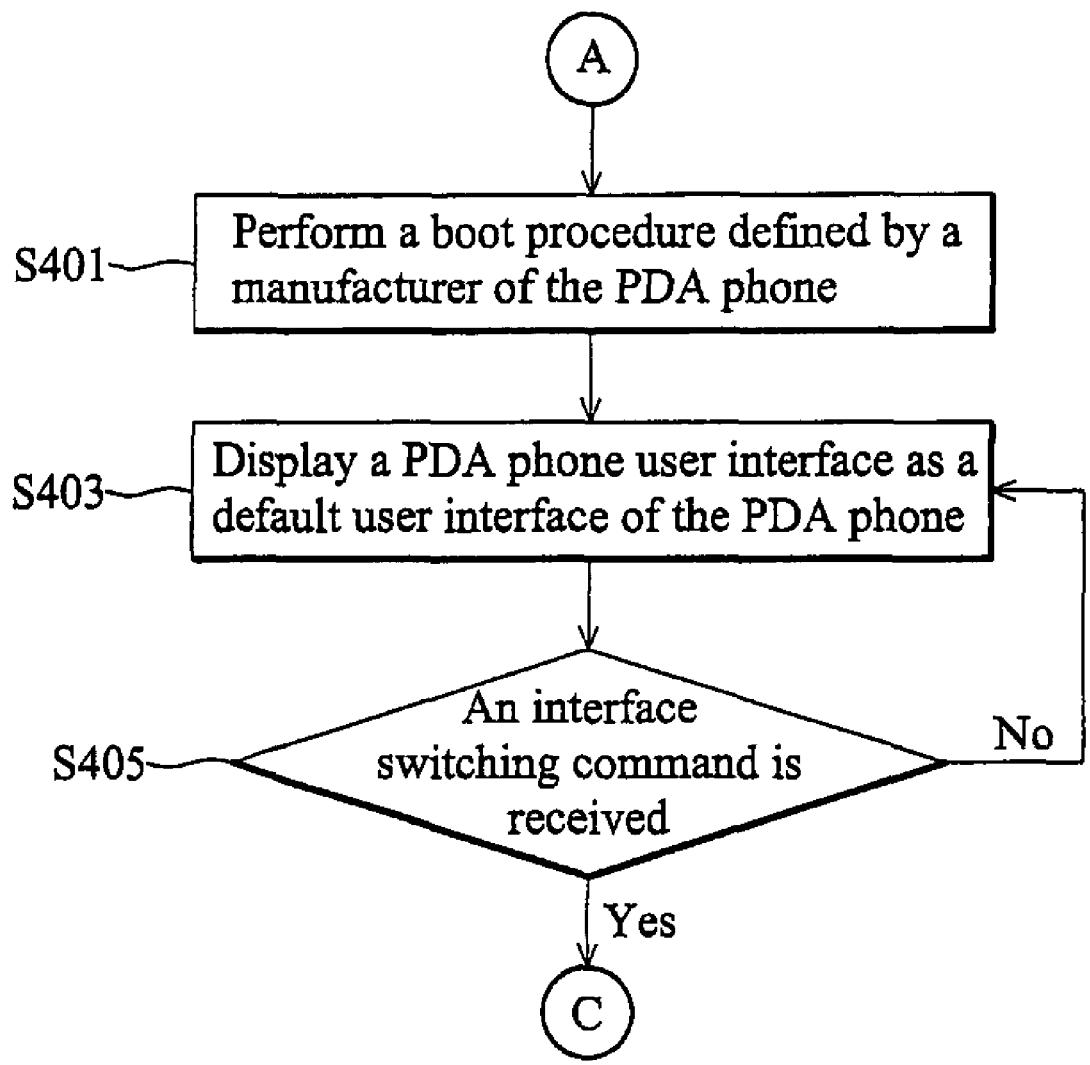
FIG. 4 shows a flowchart of the procedure A of the method of controlling a PDA phone of FIG. 3.

FIG. 4 shows a flowchart of the procedure A of the method of controlling a PDA phone of FIG. 3. In step S401, a boot procedure defined by a manufacturer of the PDA phone is performed. After the boot procedure has completed, a PDA phone interface configuration file defined by the manufacturer of the PDA phone is loaded, and a user interface corresponding to the PDA phone interface configuration file is displayed as a default user interface of the PDA phone (step S403). In step S405, it is determined whether an interface switching command is received, and if so, the method proceeds to procedure C, otherwise, the method returns to step S403. The interface switching command can be a trigger signal, wherein input of the interface switching command can be implemented by preset manipulation method, such as pressing a particular key exceeds a period of time, or other suitable manipulation methods. If the PDA phone comprises a touch sensitive screen, the interface switching command can be input by manipulating the screen in a preset way.

Figure 5:
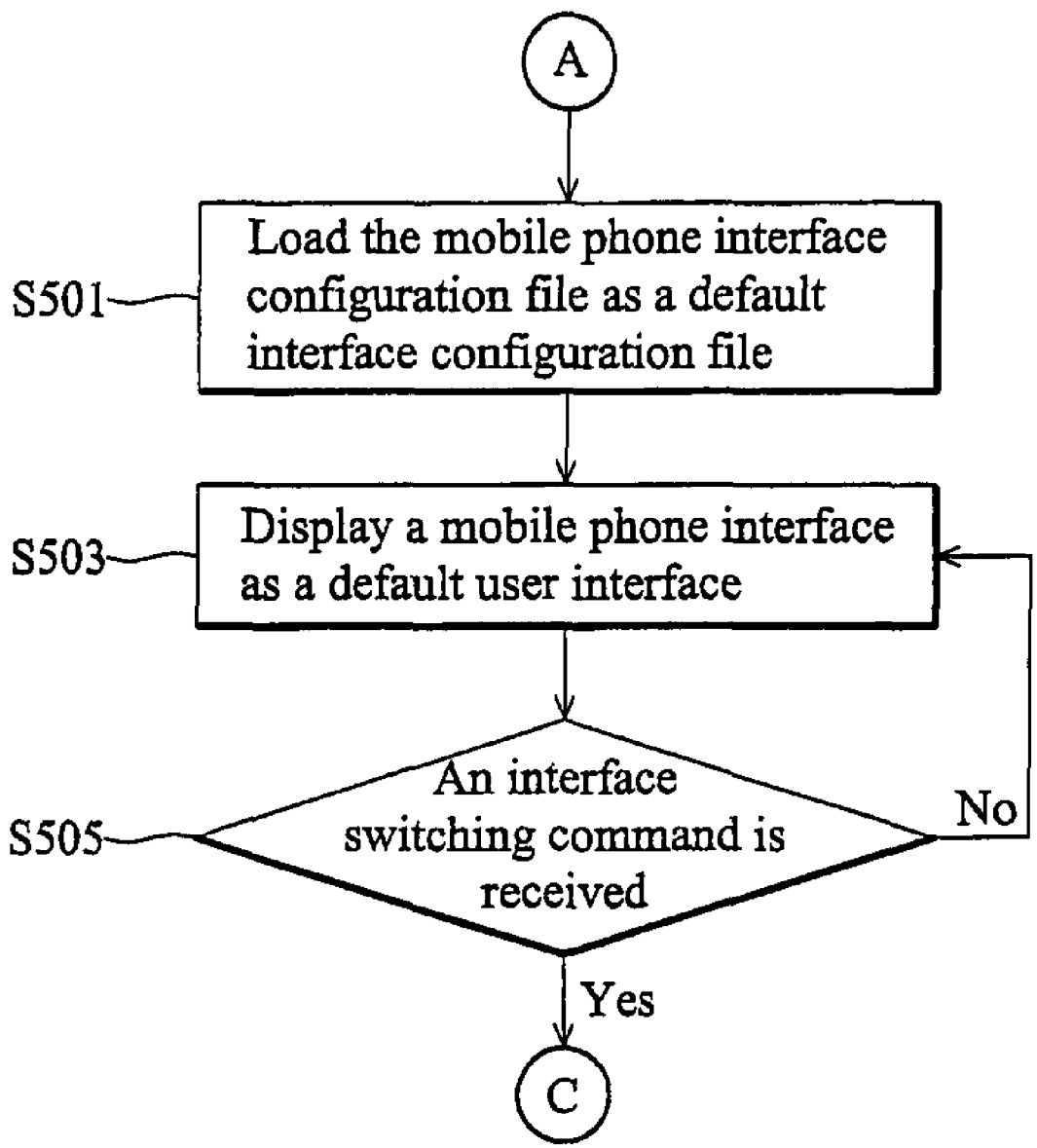
FIG. 5 shows a flowchart of the procedure B of the method of controlling a PDA phone of FIG. 3.

FIG. 5 shows a flowchart of the procedure B of the method of controlling a PDA phone of FIG. 3. In step S501, the mobile phone interface configuration file is loaded as a default interface configuration file. In step S503, a user interface defined by the mobile phone interface configuration file is displayed as a default user interface. In step S505, it is determined whether an interface switching command is received, and if so, the method proceeds to procedure C, otherwise, the method returns to step S503. As described, the interface switching command can be a trigger signal, wherein input of the interface switching command can be implemented by preset manipulation method, such as pressing a particular key exceeds a period of time, or other suitable manipulation methods. If the PDA phone comprises a touch sensitive screen, the interface switching command can be input by manipulating the screen in a preset way.

Figure 6:
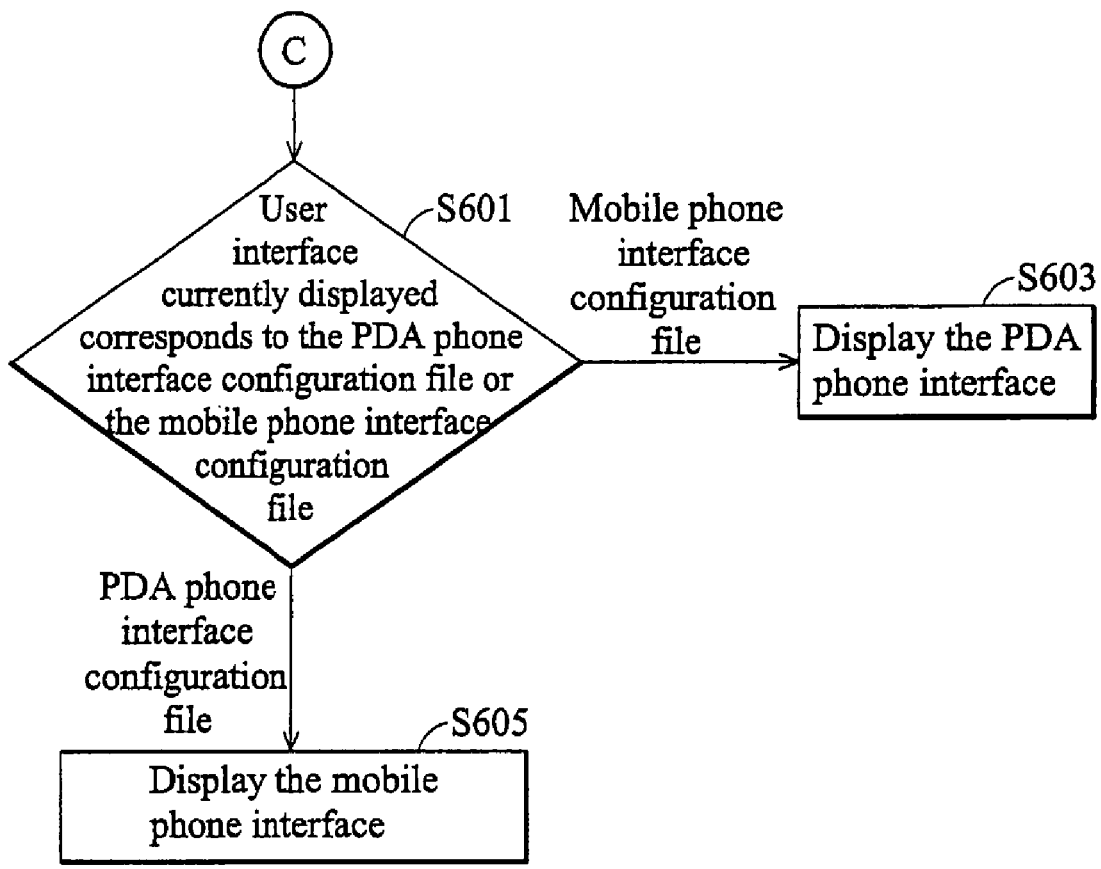
FIG. 6 shows a flowchart of the procedure C of the method of FIGS. 4 and 5.

FIG. 6 shows a flowchart of the procedure C of the method of FIGS. 4 and 5. In step S601, it is determined whether the user interface currently displayed corresponds to the PDA phone interface configuration file or the mobile phone interface configuration file. If the user interface currently displayed corresponds to the PDA phone interface configuration file, the interface defined by the mobile phone interface configuration file as the user interface of the PDA phone in step S605. If the user interface currently displayed corresponds to the mobile phone interface configuration file, the interface defined by the PDA phone interface configuration file as the user interface of the PDA phone.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of controlling a PDA (personal digital assistant) phone, comprising:
   providing a first interface configuration file and a second interface configuration file;
   receiving an interface selection command, designating the first interface configuration file or the second interface configuration file;
   performing a first boot procedure; and
   loading the first interface configuration file or the second interface configuration file designated by the interface selection command, and displaying an interface specified thereby as a user interface of the PDA phone;
   storing a flag specifying the first interface configuration file or the second interface configuration file designated by the interface selection command as a default interface configuration file; and
   performing a second boot procedure, identifying the flag, loading the default interface configuration file specified by the flag, and displaying the interface specified thereby as the user interface of the PDA phone.

2. The method of claim 1, wherein the first interface configuration file specifies a PDA phone user interface defined by a PDA phone manufacturer.

3. The method of claim 1, wherein the second interface configuration file specifies a phone user interface simulating a phone user interface of a particular phone type defined by a phone manufacturer.

4. A method of controlling a PDA (personal digital assistant) phone, comprising:
   providing a first interface configuration file and a second interface configuration file;
   receiving an interface selection command, designating the first interface configuration file or the second interface configuration file;
   performing a first boot procedure;
   loading the first interface configuration file or the second interface configuration file designated by the interface selection command, and displaying an interface specified thereby as a user interface of the PDA phone;
   after the first boot procedure has completed, and the first interface configuration file or the second interface configuration file designated by the interface selection command has been loaded, receiving an interface switching command;
   determining whether the user interface currently displayed corresponds to the first interface configuration file or the second interface configuration file;
   if the user interface currently displayed corresponds to the first interface configuration file, loading the interface defined by the second interface configuration file as the user interface of the PDA phone;
   if the user interface currently displayed corresponds to the second interface configuration file, loading the interface defined by the first interface configuration file as the user interface of the PDA phone.

5. A PDA (personal digital assistant) phone, comprising:
   a storage device, storing a first interface configuration file and a second interface configuration file;
   an input device, receiving an interface selection command, designating the first interface configuration file or the second interface configuration file;
   a controller, performing a first boot procedure, and loading the first interface configuration file or the second interface configuration file designated by the interface selection command; and
   a display device, displaying an interface specified thereby as a user interface of the PDA phone according to direction of the controller,
   wherein the storage device further stores a flag specifying the first interface configuration file or the second interface configuration file designated by the interface selection command as a default interface configuration file, and
   wherein the controller further performs a second boot procedure, identifies the flag, loads the default interface configuration file specified by the flag, and displays the interface specified thereby as the user interface of the PDA phone.

6. The PDA phone of claim 5, wherein the storage device stores the first interface configuration file specifying a PDA phone user interface defined by a PDA phone manufacturer.

7. The PDA phone of claim 5, wherein the storage device stores the second interface configuration file specifying a phone user interface simulating a phone user interface of a particular phone type defined by a phone manufacturer.

8. A PDA (personal digital assistant) phone, comprising:
a storage device, storing a first interface configuration file and a second interface configuration file;
an input device, receiving an interface selection command, designating the first interface configuration file or the second interface configuration file;
a controller, performing a first boot procedure, and loading the first interface configuration file or the second interface configuration file designated by the interface selection command; and
a display device, displaying an interface specified thereby as a user interface of the PDA phone according to direction of the controller,
wherein the controller further performs the steps of:
after the first boot procedure has completed, and the first interface configuration file or the second interface configuration file designated by the interface selection command has been loaded, receiving an interface switching command;
determining whether the user interface currently displayed corresponds to the first interface configuration file or the second interface configuration file;
if the user interface currently displayed corresponds to the first interface configuration file, loading the interface defined by the second interface configuration file as the user interface of the PDA phone;
if the user interface currently displayed corresponds to the second interface configuration file, loading the interface defined by the first interface configuration file as the user interface of the PDA phone.

9. A non-transitory computer-readable storage medium for storing a user interface controlling program for a PDA (personal digital assistant) phone, when the user interface controlling program is loaded into the PDA phone, the PDA phone is directed to perform the steps of:
receiving a first interface configuration file and a second interface configuration file;
receiving an interface selection command, designating the first interface configuration file or the second interface configuration file;
when the PDA phone performs a first boot procedure, loading the first interface configuration file or the second interface configuration file designated by the interface selection command, and displaying an interface specified thereby as a user interface of the PDA phone,
wherein the user interface controlling program directs the PDA phone to further store a flag specifying the first interface configuration file or the second interface configuration file designated by the interface selection command as a default interface configuration file, and
wherein the user interface controlling program directs the PDA phone to further perform a second boot procedure, identify the flag, load the default interface configuration file specified by the flag, and display the interface specified thereby as the user interface of the PDA phone.

10. The non-transitory computer-readable storage medium of claim 9, wherein the received and stored first interface configuration file specifies a PDA phone user interface defined by a PDA phone manufacturer.

11. The non-transitory computer-readable storage medium of claim 9, wherein the received and stored second interface configuration file specifies a phone user interface simulating a phone user interface of a particular phone type defined by a phone manufacturer.

12. A non-transitory computer-readable storage medium for storing a user interface controlling program for a PDA (personal digital assistant) phone, when the user interface controlling program is loaded into the PDA phone, the PDA phone is directed to perform the steps of:
receiving a first interface configuration file and a second interface configuration file;
receiving an interface selection command, designating the first interface configuration file or the second interface configuration file;
when the PDA phone performs a first boot procedure, loading the first interface configuration file or the second interface configuration file designated by the interface selection command, and displaying an interface specified thereby as a user interface of the PDA phone,
wherein the user interface controlling program directs the PDA phone to further perform the steps of:
after the first boot procedure has completed, and the first interface configuration file or the second interface configuration file designated by the interface selection command has been loaded, receiving an interface switching command;
determining whether the user interface currently displayed corresponds to the first interface configuration file or the second interface configuration file;
if the user interface currently displayed corresponds to the first interface configuration file, loading the interface defined by the second interface configuration file as the user interface of the PDA phone;
if the user interface currently displayed corresponds to the second interface configuration file, loading the interface defined by the first interface configuration file as the user interface of the PDA phone.

* * * * *